United States Patent
Danner et al.

(10) Patent No.: US 9,474,959 B1
(45) Date of Patent: Oct. 25, 2016

(54) FRIEND IMAGE DISPLAY IN MULTIUSER ONLINE GAMES

(75) Inventors: Matt Danner, San Francisco, CA (US); Jerome Collins, San Francisco, CA (US); Travis Brady, San Francisco, CA (US); Shannon O'Hara, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/436,261

(22) Filed: Mar. 30, 2012

Related U.S. Application Data

(63) Continuation of application No. 13/187,313, filed on Jul. 20, 2011, now abandoned.

(51) Int. Cl.
*A63F 9/24* (2006.01)
*A63F 13/00* (2014.01)

(52) U.S. Cl.
CPC . *A63F 9/24* (2013.01); *A63F 13/00* (2013.01)

(58) Field of Classification Search
None
See application file for complete search history.

(56) References Cited

U.S. PATENT DOCUMENTS

| | | | |
|---|---|---|---|
| 6,793,580 B2 | 9/2004 | Sinclair et al. | |
| 2004/0157662 A1* | 8/2004 | Tsuchiya | 463/32 |
| 2004/0224762 A1* | 11/2004 | Haga et al. | 463/33 |
| 2004/0259617 A1* | 12/2004 | Machida | 463/5 |
| 2006/0084509 A1* | 4/2006 | Novak et al. | 463/49 |
| 2006/0121990 A1 | 6/2006 | O'Kelley, II et al. | |
| 2007/0087799 A1* | 4/2007 | Van Luchene | 463/1 |
| 2007/0149266 A1* | 6/2007 | Arakawa et al. | 463/8 |
| 2007/0218965 A1* | 9/2007 | Tilston et al. | 463/2 |
| 2007/0270226 A1* | 11/2007 | York et al. | 463/43 |
| 2007/0276521 A1* | 11/2007 | Harris et al. | 700/91 |
| 2008/0070655 A1* | 3/2008 | Tanabe | 463/7 |
| 2008/0125220 A1* | 5/2008 | Sakaguchi | 463/32 |
| 2008/0182651 A1 | 7/2008 | Marshall et al. | |
| 2009/0158171 A1* | 6/2009 | Cheng et al. | 715/753 |
| 2010/0106512 A1 | 4/2010 | Hyndman et al. | |
| 2010/0184516 A1* | 7/2010 | Matsumura | 463/42 |
| 2011/0004922 A1 | 1/2011 | Bono et al. | |
| 2011/0023129 A1 | 1/2011 | Vernal et al. | |
| 2011/0269532 A1 | 11/2011 | Shuster et al. | |
| 2011/0281638 A1 | 11/2011 | Bansi et al. | |
| 2012/0218266 A1* | 8/2012 | Maeta et al. | 345/422 |

OTHER PUBLICATIONS

"U.S. Appl. No. 13/187,313, Final Office Action mailed Feb. 27, 2014", 10 pgs.
"U.S. Appl. No. 13/187,313, Response filed Dec. 19, 2013 to Non-Final Office Action dated Jul. 19, 2013", 14 pgs.

(Continued)

*Primary Examiner* — Tramar Harper
(74) *Attorney, Agent, or Firm* — Schwegman Lundberg & Woessner, P.A.

(57) ABSTRACT

This disclosure generally relates to systems and methods to provide an in-game friend object in a game instance of a multiplayer online game uniquely associated with a host player. The friend object has a unique association with a player who is a guest player with respect to the host player's game instance. A state of the friend object is automatically altered, for example deteriorating at random intervals, and can be restored subject to performance of a maintenance object by the guest player, performance of the maintenance action being limited only to the guest player. The friend object may be a display object, such as a picture frame, that displays an image associated with the guest player.

20 Claims, 13 Drawing Sheets

(56) References Cited

OTHER PUBLICATIONS

"U.S. Appl. No. 13/187,313, Non Final Office Action mailed Sep. 26, 2014", 8 pgs.
"U.S. Appl. No. 13/187,313, Response filed Jul. 28, 2014 to Final Office Action dated Feb. 27, 2014", 12 pgs.
"U.S. Appl. No. 13/187,313, Final Office Action mailed Mar. 23, 2015", 10 pgs.
"U.S. Appl. No. 13/187,313, Response filed Feb. 26, 20-15 to Non Final Office Action mailed Sep. 26, 2014", 23 pgs.
"U.S. Appl. No. 13/187,313 , Response filed Jun. 13, 2013 to Final Office Action mailed Dec. 17, 2012", 13 pgs.
"U.S. Appl. No. 13/187,313, Final Office Action mailed Dec. 17, 2012", 24 pgs.
"U.S. Appl. No. 13/187,313, Non Final Office Action mailed Jul. 2, 2012", 24 pgs.
"U.S. Appl. No. 13/187,313, Non Final Office Action mailed Jul. 19, 2013", 17 pgs.
"U.S. Appl. No. 13/187,313, Response filed Nov. 2, 2012 to Non Final Office Action mailed Jul. 2, 2012", 12 pgs.

* cited by examiner

US 9,474,959 B1

FRIEND IMAGE DISPLAY IN MULTIUSER ONLINE GAMES

CLAIM OF PRIORITY

This application is a continuation of and claims the benefit of priority under 35 U.S.C. §120 to U.S. patent application Ser. No. 13/187,313, filed on Jul. 20, 2011, which is hereby incorporated by reference herein in its entirety.

TECHNICAL FIELD

This disclosure generally relates to games and applications in general and in particular to computer-implemented online games, such as online role-playing games (RPGs), playable by more than one person from more than one location.

BACKGROUND

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DESCRIPTION OF EXAMPLE EMBODIMENTS

Figure 1:
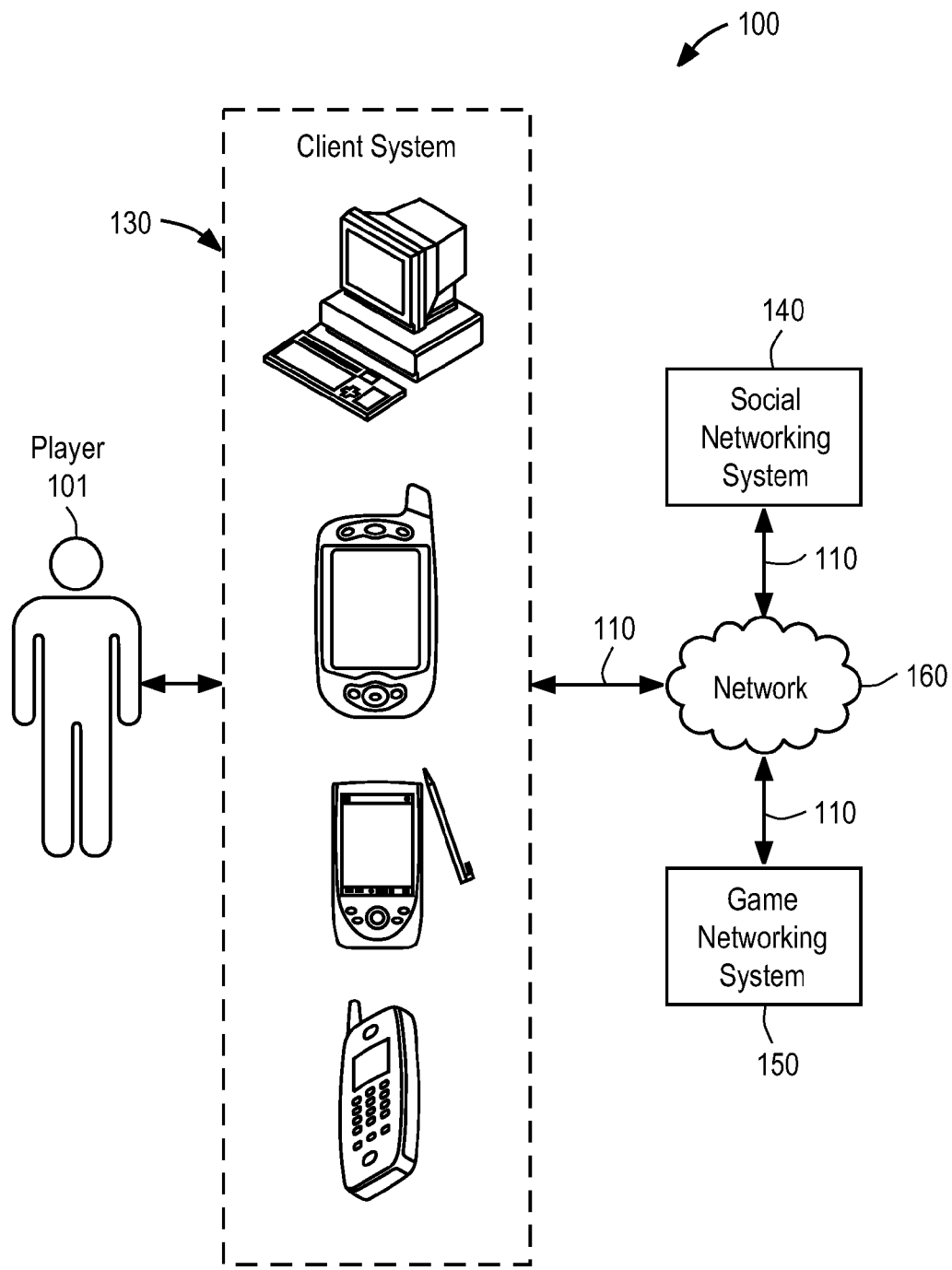
FIG. 1 illustrates an example of a system for implementing particular disclosed embodiments.

FIG. 1 illustrates an example of a system for implementing various disclosed embodiments. In particular embodiments, system 100 comprises player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 120 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in particular embodiments, client system 130 may have a direct connection to social networking system 140 or game networking system 150, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 150, which can be accessed using any suitable connection with a suitable client system 130. A player may have a game account on game networking system 150, wherein the game account can contain a variety of information associated with the player (e.g., the player's personal information, financial information, purchase history, player character state, game state). In some embodiments, a player may play multiple games on game networking system 150, which may maintain a single game account for the player with respect to all the games, or multiple individual game accounts for each game with respect to the player. In some embodiments, game networking system 150 can assign a unique identifier to each player 101 of an online game hosted on game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 140, or game networking system 150). As an example and not by way of limitation, client system 130 can download client components of an online game, which are executed locally, while a remote game server, such as game networking system 150, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 150.

Game Play

In particular embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in a online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In particular embodiments, player 101 can perform an in-game action on an in-game object. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In particular embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player can access a new area of the game).

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as "guest players." In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In particular embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure may apply to any suitable social graph users.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 140 or game networking system 150). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 150, which is managed by the game operator. In other embodiments, the social graph is part of a social networking system 140 managed by a third-party (e.g., Facebook, Friendster, Myspace). In yet other embodiments, player 101 has a social network on both game networking system 150 and social networking system 140, wherein player 101 can have a social network on the game networking system 150 that is a subset, superset, or independent of the player's social network on social networking system 140. In such combined systems, game networking system 150 can maintain social graph information with edge type attributes that indicate whether a given friend is an "in-game friend," an "out-of-game friend," or both. The various embodiments disclosed herein are operable when the social graph is managed by social networking system 140, game networking system 150, or both.

Figure 2:
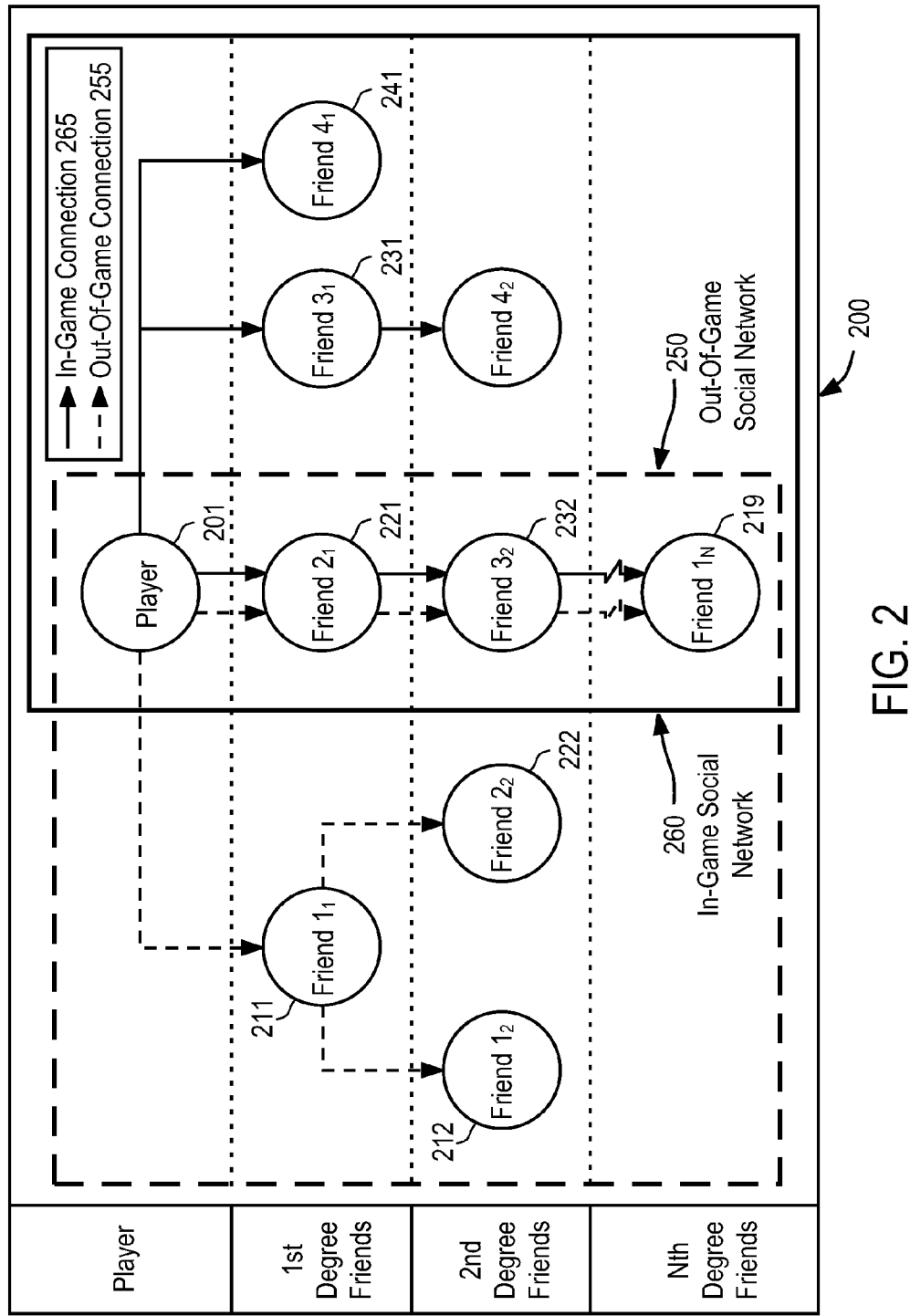
FIG. 2 illustrates an example social network.

FIG. 2 shows an example of a social network within a social graph 200. As shown, Player 201 can be associated, connected or linked to various other users, or "friends," within the social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 140.

In various embodiments, Player 201 can have Nth-degree friends connected to him through a chain of intermediary degree friends, as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network 250, but a first-degree friend in Player 201's in-game social network 260. In particular embodiments, a game engine can access in-game social network 260, out-of-game social network 250, or both.

In particular embodiments, the connections in a player's in-game social network 260 can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players can play in the same game instance. Game play is asynchronous when the players do not play simultaneously in the game instance. In particular embodiments, synchronous game play between two players in the same game instance can be simulated from asynchronous game play by recording the game play of a first player in the game instance at a first time and replaying that game play during the game play of a second player in the game instance at a later time. In particular embodiments, the game engine can record the in-game actions of a first player in a game instance for later play-back by other players in the game instance, and then the game engine loads and executes the previously recorded in-game actions during the game play of other players in the game instance.

Example System

Figure 3:
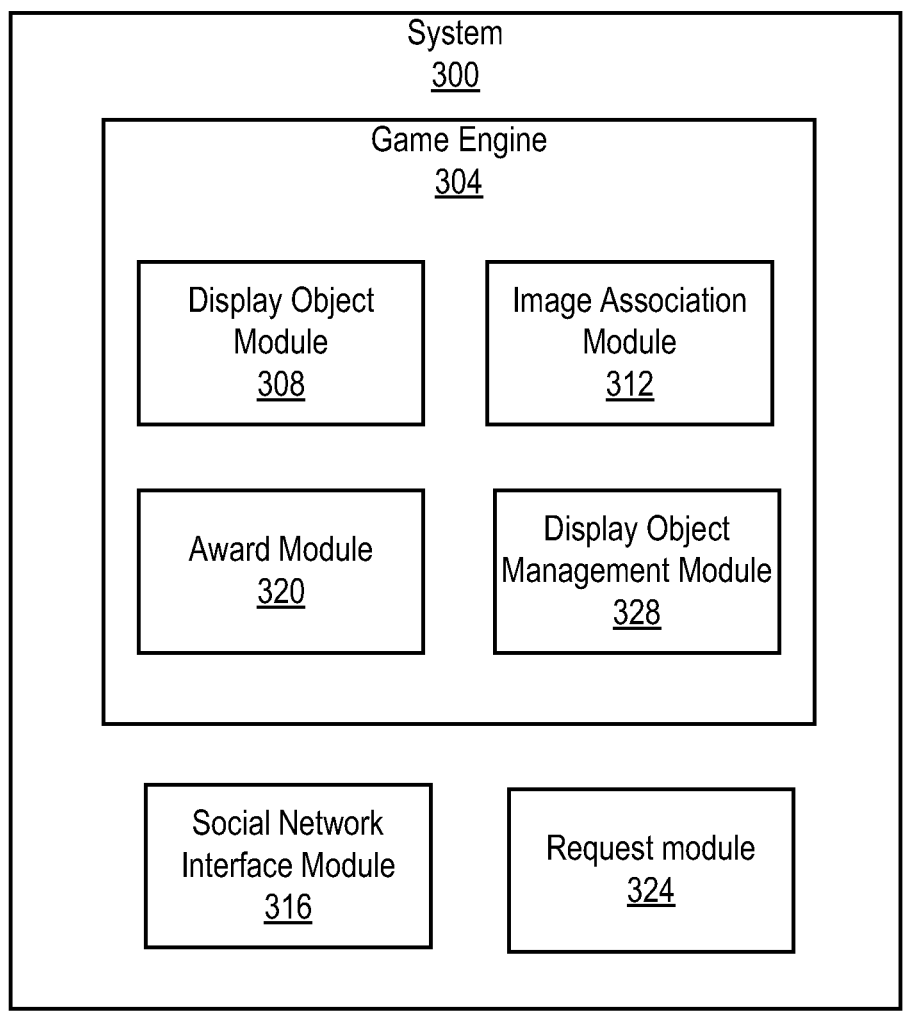
FIG. 3 illustrates an example system for implementing particular disclosed embodiments.

FIG. 3 illustrates an example system 300 for implementing particular disclosed embodiments. The system 300 may comprise a number of hardware-implemented modules provided by one or more processors. The system 300 may include a game engine 304 to manage a multiplayer online game. To this end, the game engine 304 may include game logic to manage in-game object and non-player character behavior, and to execute in-game actions responsive to user input. The game engine 304 may include a display object module 308 to generate display objects in particular game instances. An image association module 312 may be provided as part of the game engine 304 to populate display objects with images associated with guest players in particular game instances by associating a particular display object with a respective guest player image. The game engine 304 may also include an award module 320 to distribute in-game benefits or awards to guest players and/or host players based on their in-game actions, as described in greater detail below. A display object management module 328 may facilitate player interaction with a display object and/or with each other via the display object, for example by changing a state of the display object. The system 300 may further include a social network interface module 316 for accessing social networking information on the social networking system 140. A request module 324 may be provided for generating in-game and/or out-of-game display requests to request population of a display object with a particular image.

Functionality of the system 300 and its respective modules, in accordance with an example embodiment, is further described below with respect to example methods.

Example Methods

Figure 4A:
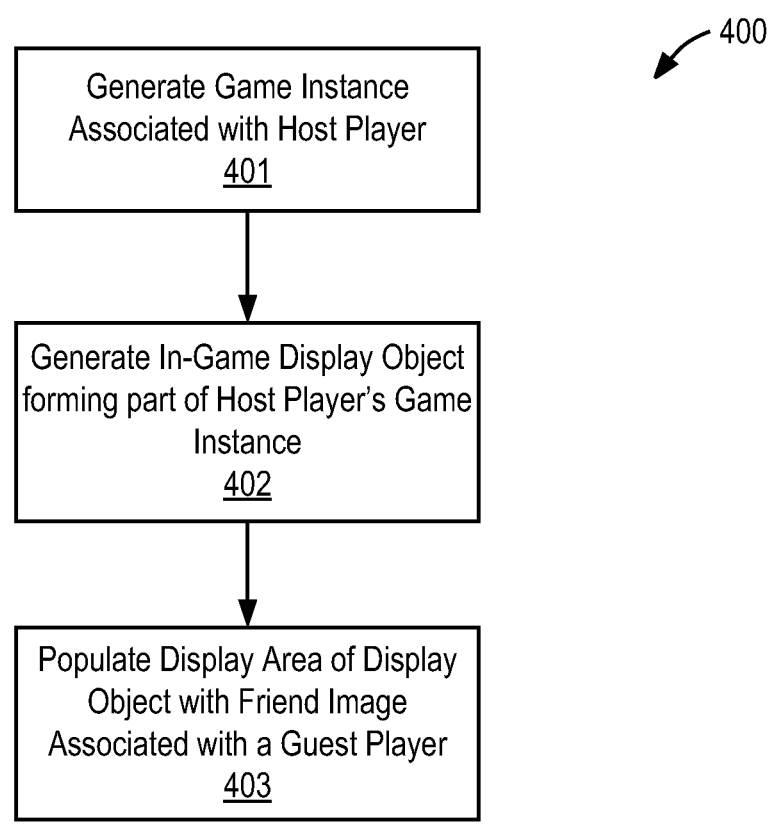
FIGS. 4A-4B illustrate an example method for implementing particular disclosed embodiments.

FIG. 4A shows a flowchart 400 of a high-level view of an example method to provide a display object in a game instance of a multiplayer online game. The method of flowchart 400 comprises generating a game instance uniquely associated with a particular player (i.e., the host player) at 401, and generating an in-game display object that forms part of the game instance at 402. The display object may have a display area to display an image in an in-game virtual environment of the game instance. At 403, the method further comprises populating the display area of the display object with a friend image that is associated with a player of the online game who is a guest player with respect to the game instance.

Figure 4B:
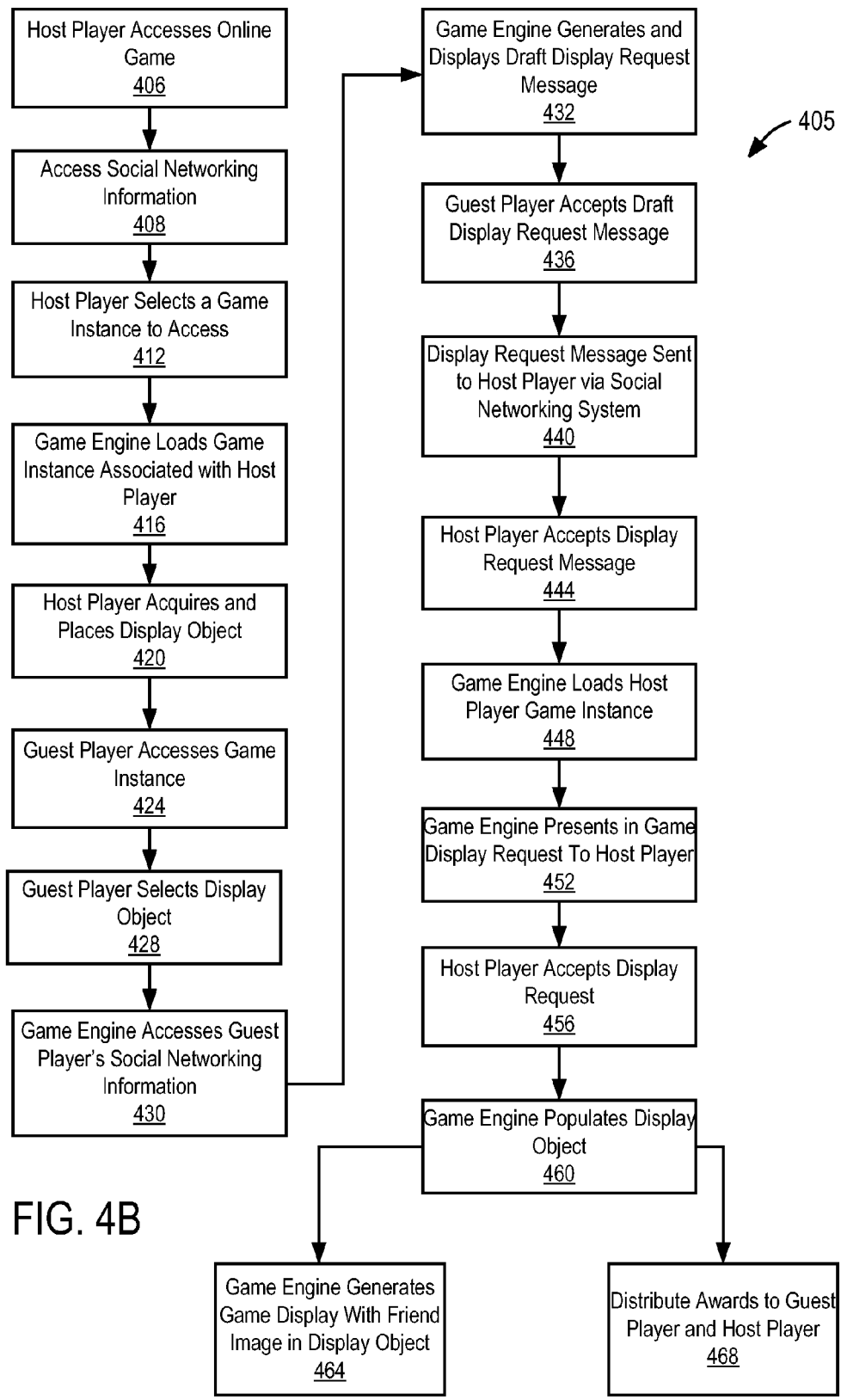

FIG. 4B illustrates another example method 405 for implementing particular disclosed embodiments. The example method 405 may be implemented by the system 300 (FIG. 3). At operation 406 a first player 201 (further referred to as the "host player") may access a multiplayer online game on game networking system 150, social networking system 140, or both. As explained above, the term "host player" means a player with whom a particular game instance is uniquely associated. The term "host player" is thus relative to a particular game instance, so that each game instance has a particular host player associated therewith. Likewise, a player who visits a game instance associated with another player is referred to as a "guest player." Each game instance may thus have a single host player and multiple guest players. Guest players may in some embodiments be limited to first level friends of the host player. 150. In the present example embodiment, and not by way of limitation, the host player 201 may access, via client system 130, a webpage hosted by social networking system 140, wherein the webpage is an embedded game interface hosted by the game networking system 150. In such a case, the system 300 providing the game engine 304 may be provided by the game networking system 150.

The social network interface module 316 may thereafter access the host player's social networking information, at operation 408. In particular embodiments, the social network interface module 316 can access social networking information on the social networking system 140, the game networking system 150, or both. As an example and not by way of limitation, the host player 201 may have an out-of-game social network 250 on social networking system 140 and an in-game social network 260 on game networking system 150, wherein the in-game social network 260 is a subset of the host player's first degree friends in out-of-game social network 250. In other embodiments, the game engine 304 does not access any social networking information, such that method 405 bypasses operation 408.

At operation 412, the host player 201 can select a game instance to access. In particular embodiments, game instances can be selected from a set of game instances associated with the host player's friends in the relevant social network. Here, the host player 201 selects the game instance uniquely associated with him/her (i.e., the game instance for which player 201 is the host player). At operation 416, the game engine 304 may then load the game instance associated with the host player. Loading of the game instance may include generating a user interface including a game display that includes a visual representation of a virtual in-game environment of the game instance.

Once the game instances loaded, at operation 416, the host player 201 may perform one or more in-game actions on one or more in-game objects in the game instance. In-game actions performed by the host player 201 and/or game state changes caused by player actions may be recorded and stored in a database in social networking system 140, game networking system 150, or both. The game engine 304 can also record any game state changes to in-game objects caused by in-game actions. This disclosure contemplates any suitable system for storing in-game actions, came state changes, and other game related data.

Figure 5A:
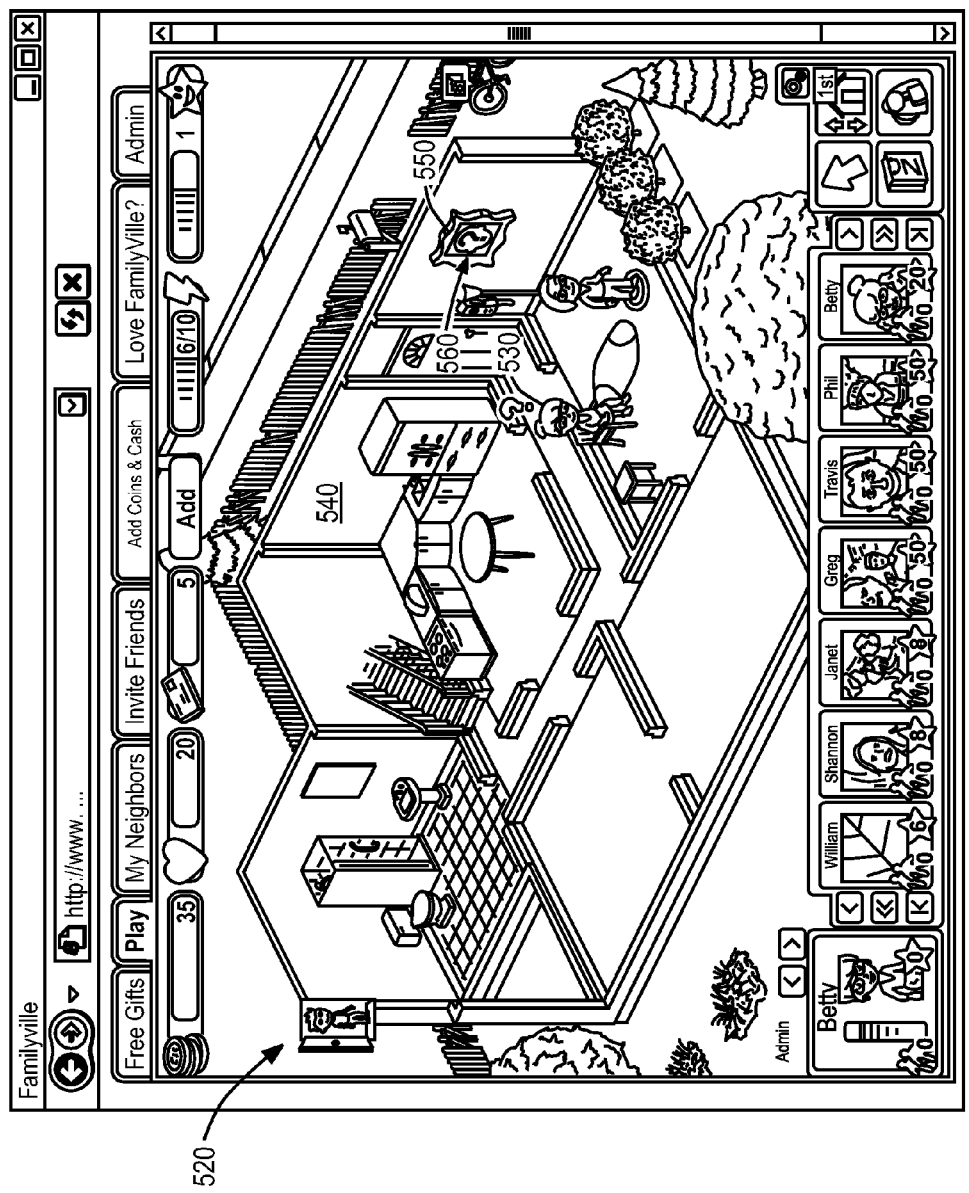
FIG. 5A illustrates an example game instance having a vacant display object

FIGS. 5A-5D illustrate an example embodiment of a game display of a game instance in an online RPG. FIG. 5A shows an example of a virtual residence or house in an online game titled Familyville and administered by Zynga.

This disclosure, however, contemplates any suitable online game. As described above, the host player 201 can access the games via a browser client 510, which presents the game display, at operation 416 (FIG. 4B). Game display 520 shows a player character 530 of host player 201 in a virtual house 540 of the game instance associated with host player 201.

Returning now to FIG. 4B, the host player 201 may purchase or otherwise acquire an in-game display object, at operation 420, in the host player's game instance. In this example embodiment, the display object may be in the form of a picture frame object 550 (FIG. 5A). The display object module 308 generates the picture frame object 550 such that it defines a particular display area 560 or surface in the in-game environment of game instance in which an image associated with a social network friend or guest player may be displayed. Such a display area 560 is provided by a central area of the picture frame object 550 bordered by a virtual frame element. The host player 201 may select a suitable position for the picture frame object 550 in the virtual house 540 of the game instance. In this example placing in FIG. 5A, the display area 560 of the picture frame object 550 is vacant, not having been populated with or associated with an image of any guest player. To indicate or emphasize vacancy of the display area 560, it may show a question mark or similar indication of vacancy.

A guest player 221 (see FIG. 2) may subsequently access the game instance of the host player 201, at operation 424 (FIG. 4B). Such accessing may comprise operations corresponding to operations 406-416. A guest player 221 thus "visits" the game instance of the host player 201 and has limited functionality in the game instance when compared to actions permitted to the host player 201. The guest player 221 may note the vacant picture frame object 550 and may wish to have an image associated with the guest player 221 displayed in the display area 560 of the picture frame object 550. To this end, the guest player 221 may perform an in-game action with respect to the picture frame object 550 to request display of his/her picture in the picture frame object 550. In this example such an in-game action may comprise selecting the picture frame object 550, at operation 428. The guest player 221 may, for example, move a cursor over the picture frame object 550 and perform a mouse click on it. While the guest player 221 can, in this example, request display of a picture in the picture frame object 550 only if it is vacant, other example embodiments may permit request for picture display with respect to occupied or populated display objects.

Figure 5B:
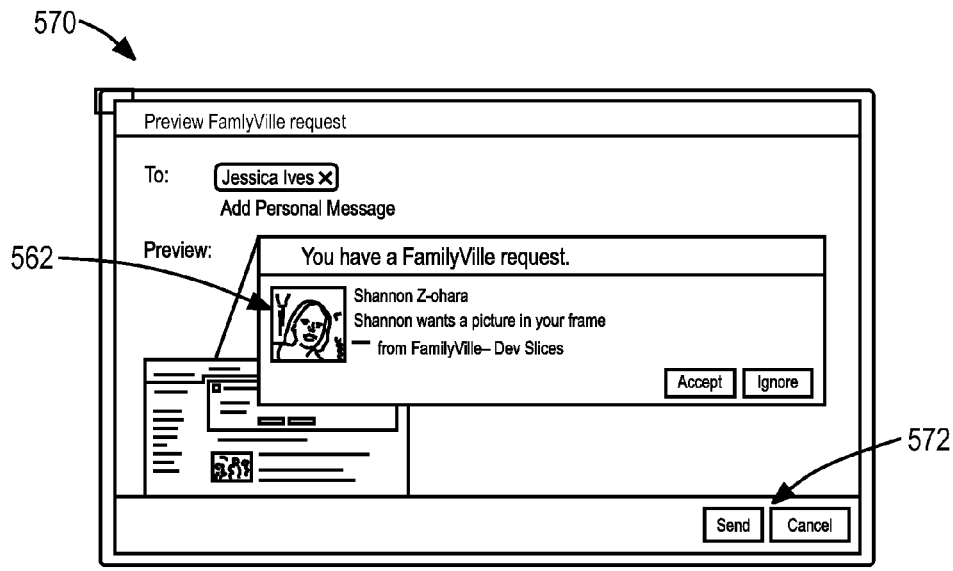
FIG. 5B illustrates an example draft display request.

In response to selection of the picture frame object 550, the request module 324 may generate a draft display request message 570 (see FIG. 5B), at operation 432, and display the draft display request message 570 in the browser client 510. The operation of generating the draft display request message 570, at operation 432, may include, at operation 430, accessing social networking information of the guest player 221 on social networking system 140 or on game networking system 150. In particular, the request module 324 may retrieve image information with respect to an image associated with the guest player 221 in the social networking system 140 or the game networking system 150, as the case may be. In the present example embodiment, the specific image associated with the guest player 221 that is retrieved at operation 430 for display as a friend image (see FIG. 5E) in the host player's game instance is a profile picture uniquely associated with the guest player 221 in the social networking system 140. The term "friend image," as used herein, means an image associated with a guest player that has access to the host player's game instance, and does not necessarily mean an image associated with a player who is a first level friend of the guest player 221 in the social networking system 140, although, in some embodiments, images displayed in the display object may in some embodiments be limited to images associated with first level friends. An example profile picture 562 is shown as being displayed as part of the draft display request message 570 (FIG. 5B). In conventional fashion, the profile picture 562 may be an image selected by the guest player 221 in the social networking system 140 to represent the guest player 221, thus being, for example, a primary visual identification image of the guest player 221 in the social networking system 140.

The guest player profile picture 562 may, in some embodiments, routinely be employed in the game networking system 150 to identify the guest player 221, and the request module 324 may, in such instances, retrieve the profile picture 562 from the game networking system 150. In other embodiments, an image other than the guest player's profile picture 562 may be employed as friend image for display in the draft display request message 570. The guest player 221 may, for example, be prompted to provide an image of choice that is to be displayed in the picture frame object 550 in association with the guest player 221. The draft display request message 570 may include soft buttons 572 for respectively accepting or canceling the draft display request message 570. After the guest player 221 accepts the draft display request message 570, at operation 436, a display request message 580 (FIG. 5C) may be sent, at operation 440, to the host player 201. In the example embodiment described with reference to FIG. 4B, the display request message 580 is sent to the host player 201, at operation 440, via the social networking system 140. The display request message 580 may thus be displayed to the host player 201 when the host player 201 next accesses or logs on to a social networking account associated with the host player 201. The display request message 580 is, in such a case, an out-of-game message or communication. In other embodiments, the display request message 580 may be communicated to the host player by an in-game display request only (see operation 452 and FIG. 5D below), thus bypassing operations 430-444.

Figure 5C:
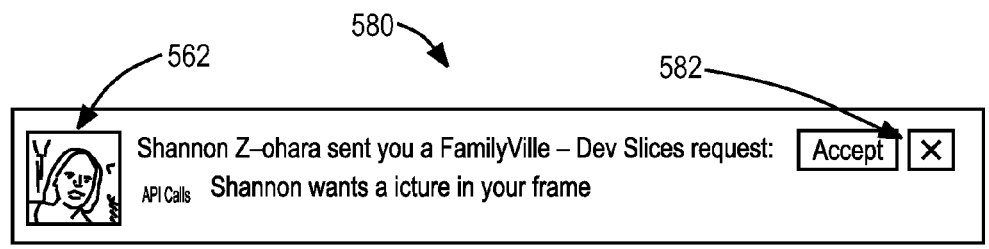
FIG. 5C illustrates an example display request.
Figure 5D:
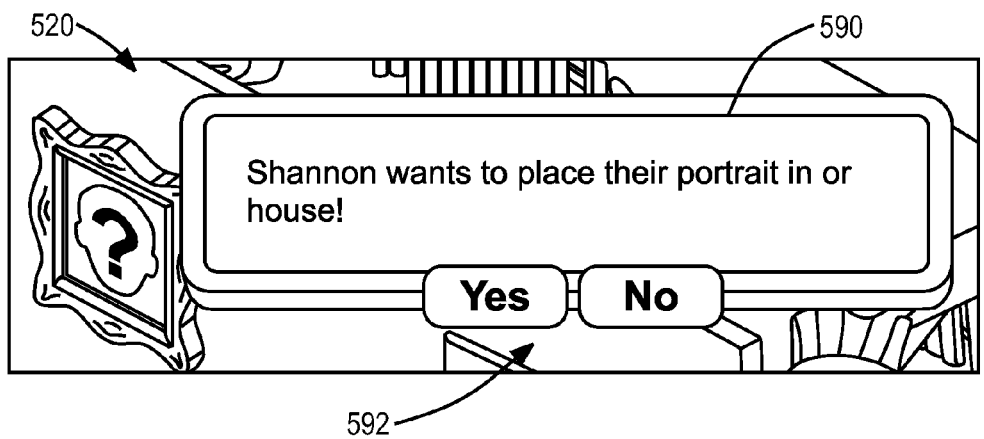
FIG. 5D illustrates an example in-game display request.

As can be seen in FIG. 5C, the social network display request message 580 may include soft buttons 582 for respectively accepting and rejecting the display request message 580. The display request message 580 may also include the proposed friend image 562 in the example form of the guest player's profile picture. When the host player 201 accepts the display request message 580, at operation 444, by clicking on the "accept" button 582, the game engine 304 loads, at operation 448, the game instance associated with the host player 201. Upon loading the game instance in response to acceptance, at operation 444, of the display request message 580, the game display 520 (see FIG. 5D), generated on a screen of the host player's client system 130, may present, at operation 452, an in-game display request 590 notifying the host player 201 of the request by the guest player 221 to place their profile picture 562 in the picture frame object 550. The in-game display request 590 comprises "yes" and "no" soft buttons 592 to accept or reject the display request 590. In other embodiments, the in-game display request 590 may additionally include a preview of the particular profile picture 562 that is to be displayed in the picture frame object 550.

As mentioned above, the in-game display request 590 may, in some embodiments, be generated without the interceding operations of generating, sending, and accepting of an out-of-game message such as the display request message 580 described with reference to operations 430-448 as being communicated by the social networking system 140. Thus, for example, no display request message 580 may be sent, in which case the in-game display request 590 may be presented to the host player 201 upon first accessing the game instance subsequent to receiving user input, at operation 428, from the guest player 221 indicating a request to display a friend image 562 in the picture frame object 550. In embodiments where synchronous or pseudo-synchronous multiplayer actions are possible, the in-game display request 590 may be presented to the host player 201 immediately subsequent to entry, at operation 428, of a display request by the guest player 221. In other embodiments, the in-game display request 590 may be omitted, so that acceptance of the social network display request message 580, at operation 444, results in immediate association of the guest player profile picture 562 with the relevant picture frame object 550 and population of the picture frame object 550 with the profile picture 562.

Figure 5E:
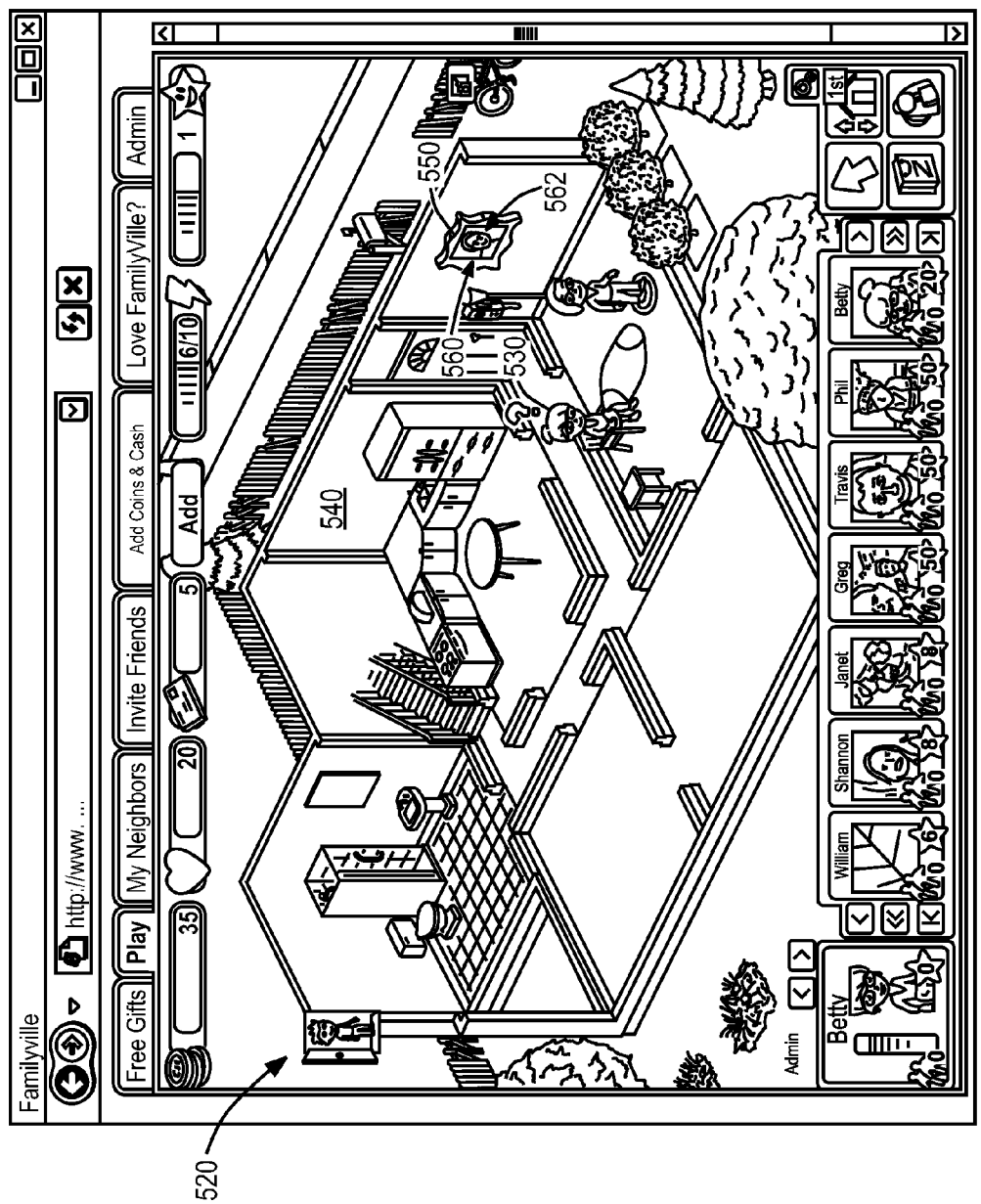
FIG. 5E illustrates an example game instance having a populated display object.

When the host player 201 accepts the in-game display request 590, at operation 456, the image association module 312 automatically populates, at operation 460, the guest player profile picture 562 with the picture frame object 550. The profile picture 562, which in this example serves as a friend image, is thus associated with the picture frame object 550 for joint display therewith. The association between the picture frame object 550 and the profile picture 562 may, for example, be stored in the game networking system 150. Thereafter, generation of the game display 520 of the game instance associated with the host player 201 includes associated display, at operation 464, of the in-game display object in the form of the picture frame object 550 and the guest player's profile picture 562. In particular, as can be seen in FIG. 5E, the profile picture 562 may be displayed in the display area 560 of the picture frame object 550. The picture frame object 550 is thus no longer vacant, but is occupied or populated by the guest player profile picture 562.

The game display 520, providing a visual representation of a virtual in-game space of the game instance (in this example, the guest player's virtual house 540) may be a three-dimensional view (for example, an isometric view). In other embodiments, a perspective view may be presented. The display area 560 of the picture frame object 550 may be in the shape of a parallelogram or trapezoid on a two-dimensional screen on which the game display 520 is generated, while the profile picture 562 may originally be square or rectangular. The method 405 may include processing or transforming the profile picture 562 to alter its shape corresponding to the shape of the display area 560 (for example, by skewing it) to maintain an illusion of three-dimensionality of the game display 520.

Populating the picture frame object 550 with the profile picture 562 may result in the distribution of in-game benefits or awards to the host player 201, the guest player 221, or both. For example, a relationship score or an experience score may be increased for both the host player 201 and the guest player 221, at operation 468, so that the award module 320 is configured to incentivize the display of friend images in display objects in the host player's game instance.

The picture frame object 550 may be accessible for player actions other than requesting display of a friend image 562 therein. Some player actions with respect to the picture frame object 550 may become available only once it is populated with a friend image 562. For example, the guest player 221 may perform an in-game action of admiring the picture frame object 550, but only if it is populated. Such admiration of the populated picture frame object 550 may result in the award of in-game benefits to the guest player 221, the host player 201, or both.

Figure 6:
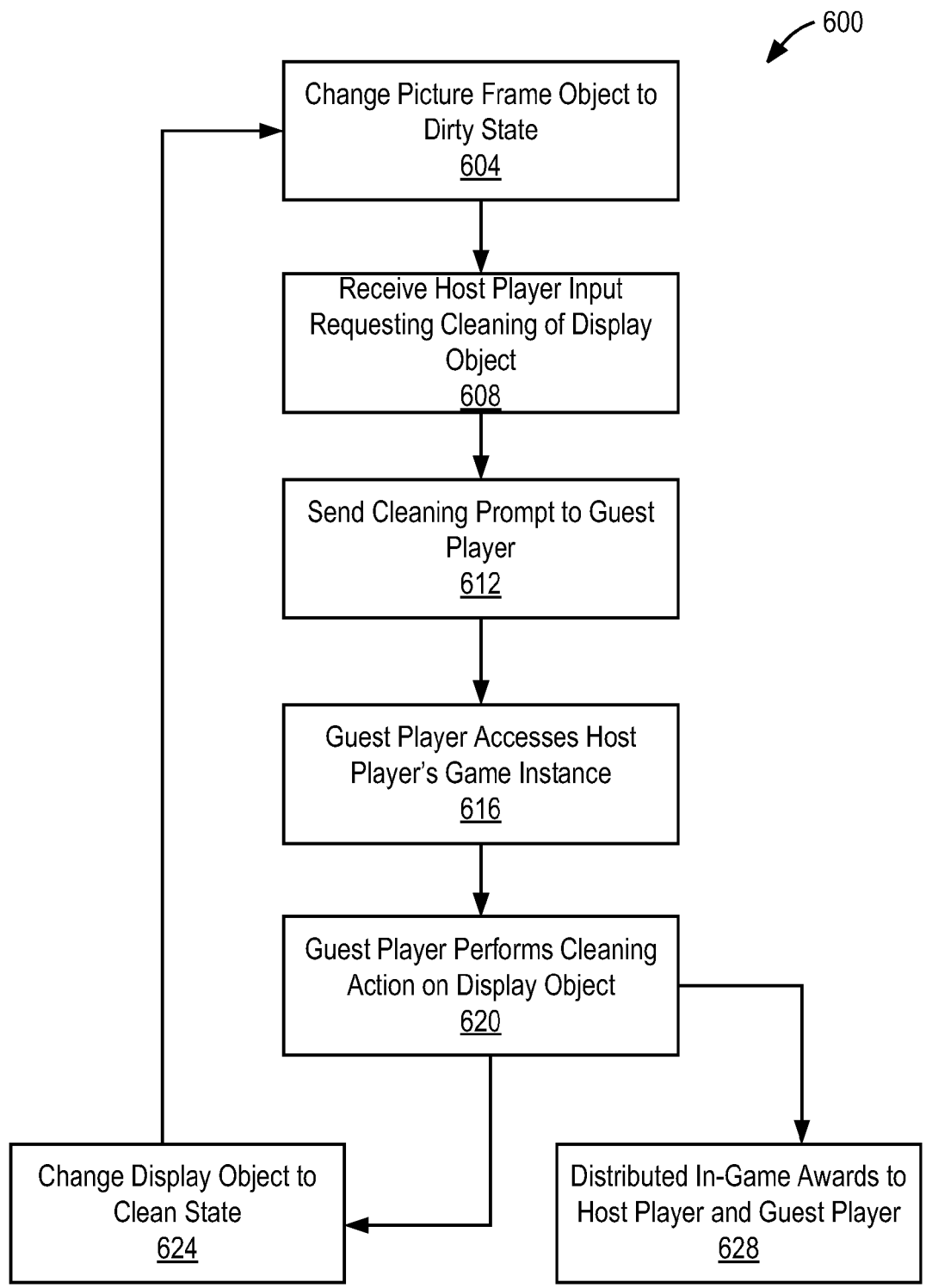
FIG. 6 illustrates an example method for implementing particular disclosed embodiments to manage an in-game display object.

FIG. 6 shows a flowchart 600 of a method to incentivize and promote player interaction with respect to the picture frame object 550. The display object management module 328 may be configured to automatically alter an in-game state of the picture frame object 550 and may require player action to restore the picture frame object 550 to its prior state. The picture frame object 550 may, for example, be changed from an original or optimal state (further referred to as a "clean state") to a non-optimal or deteriorated state (further referred to as a "dirty state") in which guest player interaction is necessary to return the picture frame object 550 to its optimal state. The picture frame object 550 may, for example, be changed to a "dirty" state, at operation 604, by the game engine 304, based on an algorithm having an element of randomness, or based on predefined in-game conditions. When the picture frame object 550 is in its dirty state, the game display 520 may show the picture frame object 550 with a visual representation of its dirty state, (e.g., with cobwebs (not shown). In one embodiment, the picture frame object 550 may be cleaned, at operation 620, to restore it to a "clean" state, at operation 624, by only the guest player 221 whose friend image is displayed in the picture frame object 550. Cleaning of the dirty picture frame object 550 by the guest player 221 may be prompted by a cleaning request initiated by the host player 201. The host player 201 may, for example, perform an in-game action on the picture frame object 550, at operation 608, to call on the guest player 221 to clean the picture frame object 550. An in-game maintenance prompt or cleaning prompt may be sent as a result, at operation 612, to the guest player 221, who may in response access the host player's game instance, at operation 616, to perform an in-game maintenance action or cleaning action, at operation 620, on the picture frame object 550, thus "cleaning" the picture frame object 550. These actions may again cause the award module 322 to credit the guest player 221, the host player 201, or both, with in-game benefits or awards, at operation 628. The method 600 may be repeated at random intervals. In other embodiments, the cleaning prompt may be communicated through the social networking system 140.

When the picture frame object 550 is in its clean state, only the host player 201 can, in the present example embodiment, interact with the picture frame object 550, so that guest players to the game instance may be prohibited from interaction with the picture frame object 550 when it is in its clean state. However, when, the picture frame object 550 is in its dirty state, interactivity of the host player 201 with respect to the picture frame object 550 may be limited to initiating a cleaning prompt to the guest player 221. In-game actions that are otherwise available to the host player 201, such as admiring the profile picture 562, may not be available to the host player 201 when the picture frame object 550 is in its dirty state.

The display object module 308 may be configured to display a friend image 562 populating the picture frame object 550 only to players who are within a predefined degree of separation from the guest player 221 in an in-game social network 260 or in an out-of-game social network 250 of the guest player 221 associated with the friend image 562. In the present example embodiment, the guest player's profile picture 562 may thus be visible only to another guest player who visits the host player's game instance if the visiting guest player is a first degree friend of the guest player 221 whose image is displayed in the picture frame object 550 (referred to for ease of description as the pictured guest player 221).

Figure 7:
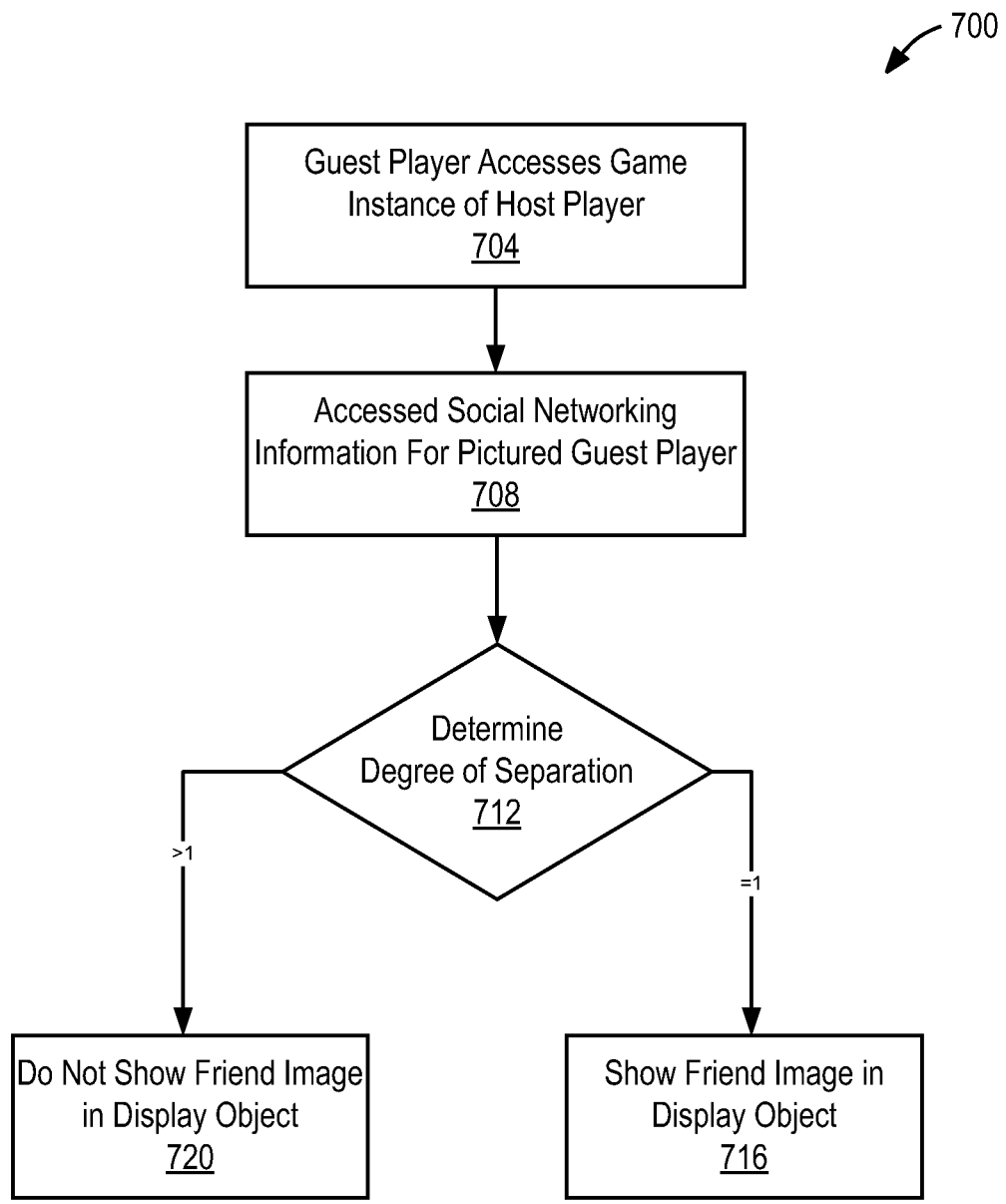
FIG. 7 illustrates an example method for implementing particular disclosed embodiments.

FIG. 7 shows a flowchart 700 of an example method to limit display of the friend image 562 to friends of the pictured guest player 221. When a visiting guest player 231 accesses, at operation 704, the game instance or in-game environment of the host player 201, the social network interface module 316 may access, at operation 708, social networking information of the pictured guest player 221 (e.g., on social networking system 140) and may determine, at operation 712, whether or not a degree of separation between the visiting guest player 231 and the pictured guest player 221 is below or equal to a predefined threshold. In the present example embodiment, the threshold degree of separation is one, so that only first level friends may view each other's friend images pictured in an in-game display object of a third player, with the third player being the host player 201 in this example.

If the pictured guest player 221 and the visiting guest player 231 are first level friends, the display object module 308 may display, at operation 716, the profile picture 562 in the picture frame object 550 to the visiting guest player 231 in a game display 520 of the host player's game instance. If, however, the visiting guest player 231 is not a first level friend of the pictured guest player 221, the picture frame object 550 may be generated, at operation 720, such that it does not show the profile picture 562 in the picture frame object 550. The display area 560 of the picture frame object 550 may, in such an instance, be shown as being blank or indistinct, without being displayed to the visiting guest player 231 as being vacant.

Figure 8:
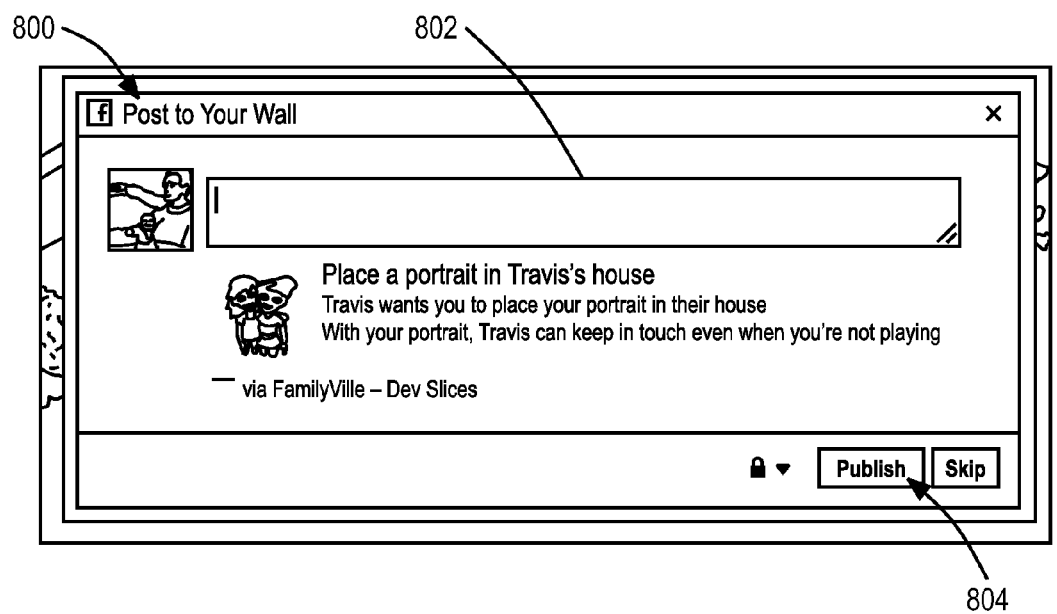
FIG. 8 illustrates an example invitation feed post.

Instead of, or in addition to, populating the picture frame object 550 in response to a display request initiated by a guest player 221 (such as, for example described with respect to operation 428 (FIG. 4B) above), the host player 201 may initiated a display request inviting players who are friends of the host player 201 to authorize display of associated images with them in the picture frame object 550. The request module 324 may, for example, be configured to automatically generate an invitation to display an image in the picture frame object 550. The invitation may be in the form of an invitation feed post or wall post that may be published in the social networking system 140. FIG. 8 shows an example draft feed post 800 that may automatically be generated responsive to placement of the picture frame object 550 by the host player 201, at operation 420 in flowchart 405 (see FIG. 4B). The draft feed post 800 may have a text box 802 to allow the host player 201 to enter free text that may form part of the invitation feed post. When the host player 201 accepts the draft feed post 800, for example, by clicking on a "publish" soft button 804 that forms part of the draft feed post 800, the invitation feed post is published in the social networking system 140. In an example, the invitation feed post is a wall post published on a homepage or "wall" uniquely associated with the host player 201 in the social networking system 140, in which case the feed post may be visible to all friends of the host player 201 who have access rights to the host player's 201 wall.

Upon acceptance of the invitation feed post by the guest player 221 (for example, by clicking on the feed post while visiting the host player's wall in the social networking system 140), the game engine 304 may load the game instance of the host player 201 and may present the guest player 221 with a confirmation prompt similar to the in-game display request 590 (FIG. 5D) presented to the host player 201 in operation 452 of method 405 (FIG. 4B). In response to acceptance of the confirmation prompt by the guest player 221, the image association module 312 may populate the picture frame object 550 with the profile picture 562 of the guest player 221.

Images eligible for display in the picture frame object 550 may be limited to images associated with player characters, so that images associated with non-player characters (NPCs) or computer simulated characters may be prohibited.

In some embodiments, a plurality of display objects, such as the picture frame object 550, may be provided in a single game instance, with the display objects being associated with respective guest players. In such a case, each of the multiple display objects may have a different friend image associated with a different guest player. A maximum number of display objects may be available to the host player, depending on the host player's level of progress in the game instance, so that a greater number of display objects may progressively become available as a host player's experience level increases.

In the above-described example embodiments, the friend image 562 is a still image, but in other embodiments, a friend image with which a display object is populated may comprise a series of pictures or images. Video material may, for example, be associated with the display object, so that the display object may display a guest player's video images in the game instance of the host player. In other example embodiments, a series of images of a host player may successively be displayed in a display object in slideshow fashion (for example, being displayed in rotation).

Although the example display object described with reference to FIGS. 5A-5E is a picture frame object 550, other embodiments may comprise display objects of a different format. For example, a display object in the form of a virtual television screen, movie screen, or computer screen may provide a display area in which still images or video images can be displayed. In other embodiments, a digital picture frame object may provide a display area in which a slideshow of just images can be displayed.

Subsequent to population of a display object with a friend image, the friend image may automatically be updated responsive to the updating or changing of the friend image in a social networking system 140. For example, in the example embodiment described with reference to FIGS. 5A-5E, the guest player 221 may change his/her profile picture in the social networking system 140. Such a change may automatically be mirrored by the image association module 312, so that the friend image 562 displayed in the picture frame object 550 automatically reflects the latest social network profile picture of the guest player 221.

Data Flow

Figure 9:
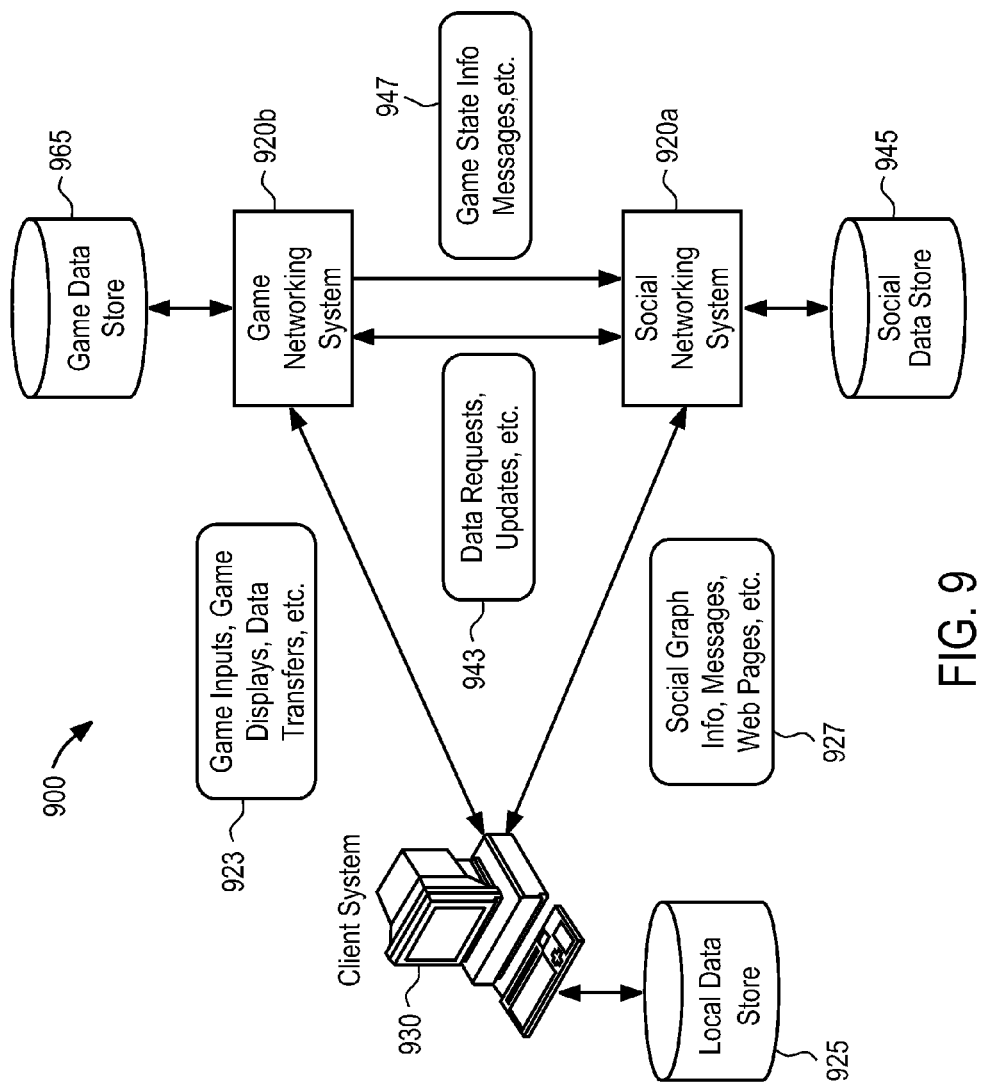
FIG. 9 illustrates an example data flow in a system.

FIG. 9 illustrates an example data flow between the components of an example system 900. In particular embodiments, system 900 can include client system 930, social networking system 920a, and game networking system 920b. A system 300 such as that described with reference to FIG. 3 may be provided by the client system 930, the social networking system 920a, or the game networking system 920b, or by any combination of these systems. The components of system 900 can be connected to each other in any suitable configuration, using any suitable type of connection. The components may be connected directly or over any suitable network. Client system 930, social networking system 920a, and game networking system 920b can each have one or more corresponding data stores such as local data store 925, social data store 945, and game data store 965, respectively. Social networking system 920a and game networking system 920b can also have one or more servers that can communicate with client system 930 over an appropriate network. Social networking system 920*a* and game networking system 920*b* can have, for example, one or more Internet servers for communicating with client system 930 via the Internet. Similarly, social networking system 920*a* and game networking system 920*b* can have one or more mobile servers for communicating with client system 930 via a mobile network (e.g., GSM, PCS, Wi-Fi, WPAN, etc.). In some embodiments, one server may be able to communicate with client system 930 over both the Internet and a mobile network. In other embodiments, separate servers can be used.

Client system 930 can receive and transmit data 923 to and from game networking system 920*b*. This data can include, for example, webpages, messages, game inputs, game displays, HTTP packets, data requests, transaction information, updates, and other suitable data. At some other time, or at the same time, game networking system 920*b* can communicate data 943, 947 (e.g., game state information, game system account information, page info, messages, data requests, updates, etc.) with other networking systems, such as social networking system 920*a* (e.g., Facebook, Myspace, etc.). Client system 930 can also receive and transmit data 927 to and from social networking system 920*a*. This data can include, for example, webpages, messages, social graph information, social network displays, HTTP packets, data requests, transaction information, updates, and other suitable data.

Communication between client system 930, social networking system 920*a*, and game networking system 920*b* can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 920*b*, the BLOB containing the game state for the instance corresponding to the player can be transmitted to client system 930 for use by a client-side executed object to process. In particular embodiments, the client-side executable may be a FLASH-based game, which can de-serialize the game state data in the BLOB. As a player plays the game, the game logic implemented at client system 930 maintains and modifies the various game state parameters locally. The client-side game logic may also batch game events, such as mouse clicks, and transmit these events to game networking system 920*b*. Game networking system 920*b* may itself operate by retrieving a copy of the BLOB from a database or an intermediate memory cache (memcache) layer. Game networking system 920*b* can also de-serialize the BLOB to resolve the game state parameters and execute its own game logic based on the events in the batch file of events transmitted by the client to synchronize the game state on the server side. Game networking system 920*b* may then re-serialize the game state, now modified, into a BLOB, and pass this to a memory cache layer for lazy updates to a persistent database.

With a client-server environment in which the online games may run, one server system, such as game networking system 920*b*, may support multiple client systems 930. At any given time, there may be multiple players at multiple client systems 930 all playing the same online game. In practice, the number of players playing the same game at the same time may be very large. As the game progresses with each player, multiple players may provide different inputs to the online game at their respective client systems 930, and multiple client systems 930 may transmit multiple player inputs and/or game events to game networking system 920*b* for further processing. In addition, multiple client systems 930 may transmit other types of application data to game networking system 920*b*.

In particular embodiments, a computed-implemented game may be a text-based or turn-based game implemented as a series of web pages that are generated after a player selects one or more actions to perform. The web pages may be displayed in a browser client executed on client system 930. As an example and not by way of limitation, a client application downloaded to client system 930 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 920*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 930, either caused by an action of a game player or by the game logic itself, client system 930 may need to inform game networking system 920*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 900 is discussed in reference to updating a multi-player online game hosted on a network-addressable system (such as, for example, social networking system 920*a* or game networking system 920*b*), where an instance of the online game is executed remotely on a client system 930, which then transmits application event data to the hosting system such that the remote game server synchronizes the game state associated with the instance executed by the client system 930.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 930 may include a Flash client. The Flash client may be configured to receive and run Flash application or game object code from any suitable networking system (such as, for example, social networking system 920*a* or game networking system 920*b*). In particular embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 930, the Flash client may send the events that caused the game state changes to the in-game object to game networking system 920*b*. However, to expedite the processing and hence the speed of the overall gaming experience, the Flash client may collect a batch of some number of events or updates into a batch file. The number of events or updates may be determined by the Flash client dynamically or determined by game networking system 920*b* based on server loads or other factors. For example, client system 930 may send a batch file to game networking system 920*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 930. In particular embodiments, the batch file may be a text file and the name-value pairs may be in string format.

In particular embodiments, when a player plays an online game on client system 930, game networking system 920*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 920*b* may retrieve the corresponding BLOB from the database to determine the most-recent values of the game-related data. In particular embodiments, while a player is playing the online game, game networking system 920*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 10:
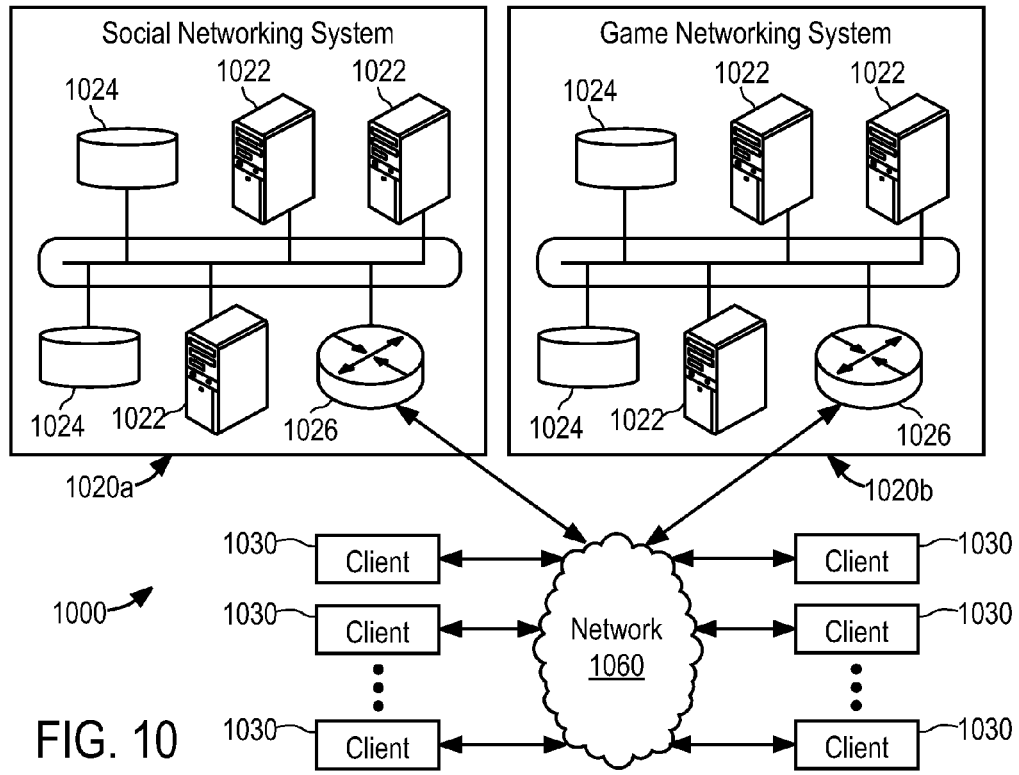
FIG. 10 illustrates an example network environment.

Particular embodiments may operate in a WAN environment, such as the Internet, including multiple network addressable systems. FIG. 10 illustrates an example network environment 1000, in which various example embodiments may operate. Network cloud 1060 generally represents one or more interconnected networks, over which the systems and hosts described herein can communicate. Network cloud 1060 may include packet-based WAN (such as the Internet), private networks, wireless networks, satellite networks, cellular networks, paging networks, and the like. As FIG. 10 illustrates, particular embodiments may operate in a network environment comprising one or more networking systems, such as social networking system 1020*a*, game networking system 1020*b*, and one or more client systems 1030. The components of social networking system 1020*a* and game networking system 1020*b* operate analogously; as such, hereinafter they may be referred to simply at networking system 1020. Client systems 1030 are operably connected to the network environment via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment described above and illustrated in FIG. 10 is described with respect to social networking system 1020a and game networking system 1020b, this disclosure encompasses any suitable network environment using any suitable systems. As an example and not by way of limitation, the network environment may include online media systems, online reviewing systems, online search engines, online advertising systems, or any combination of two or more such systems.

Figure 11:
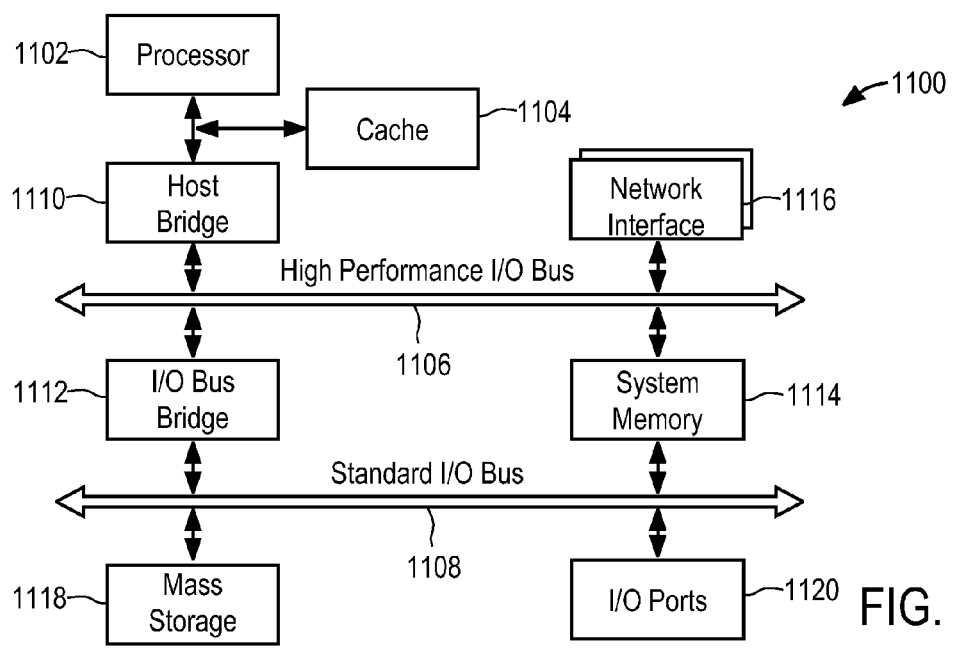
FIG. 11 illustrates an example computer system architecture.

FIG. 11 illustrates an example computing system architecture, which may be used to implement a server 1022 or a client system 1030. In one embodiment, hardware system 1100 comprises a processor 1102, a cache memory 1104, and one or more executable modules and drivers, stored on a tangible computer readable medium, directed to the functions described herein. Additionally, hardware system 1100 may include a high performance input/output (I/O) bus 1106 and a standard I/O bus 1108. A host bridge 1110 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1100 may further include video memory (not shown) and a display device coupled to the video memory. Mass storage 1118 and I/O ports 1120 may couple to bus 1108. Hardware system 1100 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1100 are described in greater detail below. In particular, network interface 1116 provides communication between hardware system 1100 and any of a wide range of networks, such as an Ethernet (e.g., IEEE 802.3) network, a backplane, and the like. Mass storage 1118 provides permanent storage for the data and programming instructions to perform the above-described functions implemented in servers 422, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures and various components of hardware system 1100 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft(r) Windows(r) operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry.

Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
generating a game instance of a computer-implemented online game playable via the game instance by multiple players by use of respective user devices communicatively coupled to a game server via a distributed computer network, the multiple players comprising a host player and a plurality of guest players, the game instance being uniquely associated with the host player and comprising a virtual in-game environment in which multiple player characters are movable under control by respective ones of the multiple players, the game instance further comprising multiple non-character in-game objects located within the virtual in-game environment and receptive to in-game actions performed thereon by one or more of the multiple player characters;
in an automated operation using one or more processors configured therefor, altering a state of a friend object in the game instance of the host player, the friend object being a particular one of the multiple non-character in-game objects, having a unique association with a particular one of the plurality of guest players, and being located within the virtual in-game environment of the game instance;
preventing all of the multiple players, except for the particular guest player, from performing a maintenance action with respect to the friend object, thereby permitting only the particular guest player to perform the maintenance action with respect to the friend object; and
in an automated operation using the one or more processors, restoring the state of the friend object to a condition prior to the automatic alteration, responsive to performance of the maintenance action by the particular guest player by direct interaction therewith.

2. The computer-implemented method of claim 1, wherein the automatic altering of the state of the friend object comprises automatically altering the state of the friend object from an original state to a deteriorated state.

3. The computer-implemented method of claim 2, wherein altering the state of the friend object comprises altering a visual representation of the friend object in the game instance, so that the visual representation of the friend object in its deteriorated state is visibly deteriorated relative to the visual representation of the friend object in its original state.

4. The computer-implemented method of claim 1, wherein permitting the particular guest player to perform the maintenance action comprises generating the game instance of the host player and permitting access by the particular guest player to the game instance of the host player.

5. The computer-implemented method of claim 1, further comprising repeating a cycle comprising the automatic altering of the state of the friend object and the restoring of the state of the friend object responsive to performance of the maintenance action.

6. The computer-implemented method of claim 5, wherein successive automatic state alterations are separated by random intervals.

7. The computer-implemented method of claim 5, wherein the automatic alteration of state of the friend object is responsive to the presence of predefined in-game conditions.

8. The computer-implemented method of claim 1, further comprising crediting the particular guest player with in-game benefits responsive to performance of the maintenance action.

9. The computer-implemented method of claim 1, further comprising crediting the host player with in-game benefits responsive to performance of the maintenance action.

10. The computer-implemented method of claim 1, wherein the friend object is a display object having a display area to display an image in an in-game virtual environment of the game instance, the unique association between the particular guest player and the friend object being that a friend image uniquely associated with the particular guest player is displayed in the display area of the friend object.

11. A system comprising:
a hardware-implemented game engine comprising one or more processors configured to generate a game instance of a computer-implemented online game playable via the game instance by multiple players by use of respective user devices communicatively coupled to a game server via a distributed computer network, the multiple players comprising a host player and a plurality of guest players, the game instance being uniquely associated with the host player and comprising a virtual in-game environment in which multiple player characters are movable under control by respective ones of the multiple players, the game instance further comprising multiple non-character in-game objects located within the virtual in-game environment and receptive to in-game actions performed thereon by one or more of the multiple player characters; and
a hardware-implemented object management module comprising at least one processor configured to:
automatically alter a state of a friend object in the game instance of the host player, the friend object being a particular one of the multiple non-character in-game objects, having a unique association with a particular one of the plurality of guest players, and being located within the virtual in-game environment of the game instance;
prevent all of the multiple players, except for the particular, guest player, from performing a maintenance action with respect to the friend object, thereby to permit only the particular guest player to perform the maintenance action with respect to the friend object by direct interaction therewith; and
restore the state of the friend object to a condition prior to the automatic alteration, responsive to performance of the maintenance action by the particular guest player.

12. The system of claim 11, wherein the object management module is configured automatically to alter the state of the friend object by automatically altering the state of the friend object from an original state to a deteriorated state.

13. The system of claim 12, wherein the game engine is configured to:
limit interaction of the particular guest player with the friend object, while the friend object is in the original state, to an original set of actions available to the particular guest player;
limit interaction of the host player with the friend object, while the friend object is in the deteriorated state, to a reduced set of actions available to the particular guest player relative to the original set of actions available to the particular guest player; and
in response to performance of the maintenance action by the friend player, restoring limitation of interaction of the particular guest player with the friend object to the original set of actions available to the particular guest player.

14. The system of claim 12, wherein the game engine is configured to prohibit interaction of the particular guest player with the friend object while the friend object is in its original state.

15. The system of claim 12, further comprising a request module to communicate to the particular guest player a maintenance prompt, to request performance of the maintenance action by the particular guest player with respect to the friend object.

16. The system of claim 15, wherein the request module is configured to communicate the maintenance prompt responsive to receiving input from the host player requesting performance of the maintenance action.

17. The system of claim 16, wherein the game engine is configured to allow performance of the maintenance action as the only action available to the host player while the friend object is in its deteriorated state.

18. The system of claim 11, further comprising an award module to credit the host player and/or the particular guest player with in-game benefits responsive to performance of the maintenance action.

19. The system of claim 11, wherein the friend object is a display object having a display area to display an image in an in-game virtual environment of the game instance, the unique association between the particular guest player and the friend object being that a friend image uniquely associated with the particular guest player is displayed in the display area of the friend object.

20. A non-transitory machine-readable storage medium storing instructions which, when performed by a machine, cause the machine to perform operations comprising:
generating a game instance of a computer-implemented online game playable via the game instance by multiple players by use of respective user devices communicatively coupled to a game server via a distributed computer network, the multiple players comprising a host player and a plurality of guest players, the game instance being uniquely associated with the host player and comprising a virtual in-game environment in which multiple player characters are movable under control by respective ones of the multiple players, the game instance further comprising multiple non-character in-game objects located within the virtual in-game environment and receptive to in-game actions performed thereon by one or more of the multiple player characters;
altering a state of a friend object in the game instance of the host player, the friend object being a particular one of the multiple non-character in-game objects, having a unique association with a particular one of the plurality of guest players, and being located within the virtual in-game environment of the game instance;
preventing all of the multiple players, except for the particular guest player, from performing a maintenance action with respect to the friend object, thereby to permit only the particular guest player to perform the maintenance action with respect to the friend object; and
restoring the state of the friend object to a condition prior to the automatic alteration, responsive to performance of the maintenance action by the particular guest player by direct interaction with the friend object.

* * * * *

UNITED STATES PATENT AND TRADEMARK OFFICE
CERTIFICATE OF CORRECTION

PATENT NO. : 9,474,959 B1  
APPLICATION NO. : 13/436261  
DATED : October 25, 2016  
INVENTOR(S) : Danner et al.

Page 1 of 1

It is certified that error appears in the above-identified patent and that said Letters Patent is hereby corrected as shown below:

In Column 1, Line 65, delete "object" and insert --object.--, therefor

In Column 2, Line 50, delete "120" and insert --140--, therefor

In Column 14, Line 39, delete "322" and insert --320--, therefor

In Column 27, Line 44, in Claim 11, delete "particular," and insert --particular--, therefor Signed and Sealed this
Eighth Day of May, 2018

Andrei Iancu
*Director of the United States Patent and Trademark Office*